E. F. W. ALEXANDERSON.
ELECTRIC BRAKING WITH ALTERNATING CURRENT MOTORS.
APPLICATION FILED OCT. 19, 1911.

1,089,384.

Patented Mar. 3, 1914

Witnesses:
Earl G. Klock
J. Ellis Glen

Inventor:
Ernst F. W. Alexanderson.
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC BRAKING WITH ALTERNATING-CURRENT MOTORS.

1,089,384. Specification of Letters Patent. Patented Mar. 3, 1914.

Application filed October 19, 1911. Serial No. 655,477.

*To all whom it may concern:*

Be it known that I, ERNST F. W. ALEXANDERSON, a citizen of the United States, residing at Schenectady, in the county of Schenectady, State of New York, have made certain new and useful Improvements in Electric Braking with Alternating-Current Motors, of which the following is a specification.

My invention relates to alternating current commutator motors of the series type, that is, motors having an exciting winding adapted for connection in series with the armature for motor operation, and has for its purpose the provision of a suitable arrangement for operating such motors as braking generators.

A difficulty which has been encountered heretofore in operating such motors as braking generators is that the motor when connected for braking tends to build up on its residual magnetism as a direct current series generator. The ohmic resistance of the motor circuit is ordinarily low so that excessive braking action is produced. It has been proposed heretofore to avoid this effect by connecting the motor armature and exciting winding in series through a transformer, instead of directly, so as to prevent the building up of a direct current and its magnetization. Such an arrangement, however, is not satisfactory with a transformer of the ordinary type because, although operation as a direct current generator is prevented, nevertheless the motor may build up as a low frequency generator giving strong pulsations which are unstable and excessive.

My invention consists in an arrangement whereby the low frequency pulsations are avoided. To this end I employ a transformer of a special and inefficient design for connecting the armature and exciting windings in series. This transformer is so arranged as to require an abnormally high magnetizing current, as by placing an air gap in the magnetic circuit of the transformer. The result is that a small low frequency current in the primary of the transformer is not effective for creating an induced secondary voltage large enough to produce the undesirable effects mentioned above, while the higher frequency currents, that is, currents of the frequency of the source, will produce a correspondingly higher voltage in the transformer secondary which supplies the exciting winding of the motor.

My invention will best be understood by reference to the accompanying drawings, in which—

Figure 1:
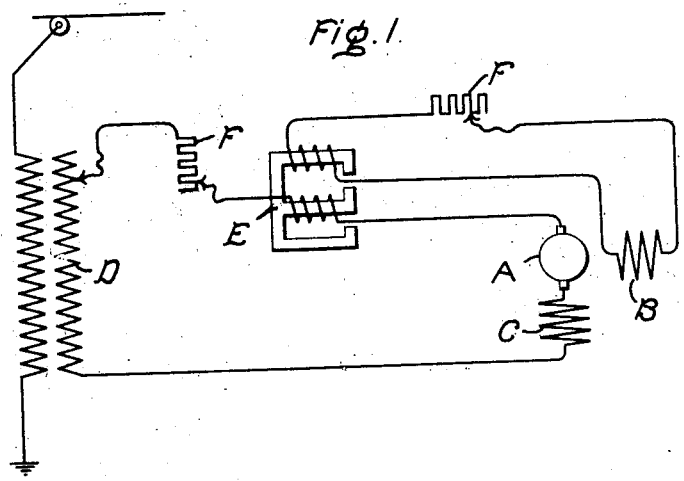
Figure 2:
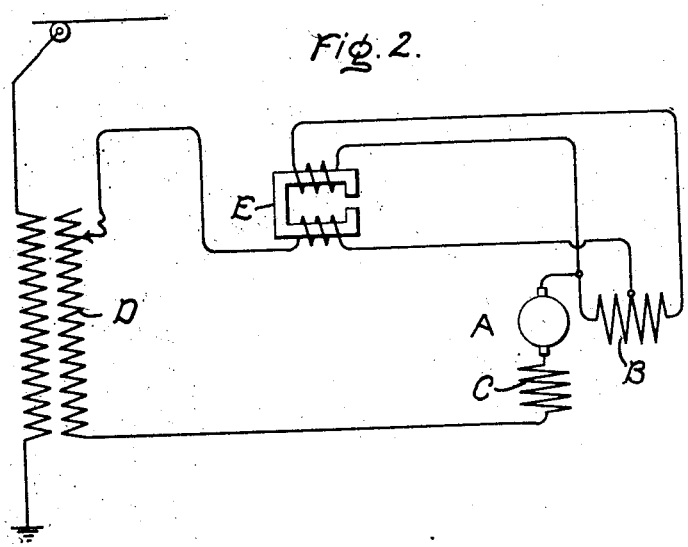

Figure 1 shows diagrammatically an arrangement for electric braking in accordance with my invention, and Fig. 2 shows a modification.

In Fig. 1 A represents the armature, B the exciting winding and C the compensating winding of an alternating current series motor; D represents a supply transformer acting as the source of current for motor operation, and receiving the current generated by the motor in electric braking; E represents a transformer having its primary winding connected in series with the motor armature A and compensating winding C to the transformer D, and its secondary winding connected to the exciting winding B. Of course, when the motor is used for electric braking, the exciting winding B is connected to the secondary winding of the transformer E in such a direction as to produce a generator torque, or, in other words, a torque opposite to the direction of rotation. This transformer E is arranged with an air gap in its magnetic circuit so as to require an abnormally high magnetizing current for effective operation. The efficiency of the transformer may in many cases also be advantageously further decreased by providing a leakage path for the primary flux as is indicated by the unwound third leg of the magnetic circuit of the transformer in Fig. 1. The effect of this inefficient design, as has been heretofore explained, is to render the low frequency currents which may be generated in the motor armature comparatively ineffective to excite the winding B, while the relative effect of currents of the frequency of the source is very much greater. The low frequency currents can further be controlled by employing non-inductive resistances F in either or both circuits of the transformer E.

Instead of using resistances to augment the effect of the inefficient design of transformer E, the arrangement of Fig. 2 may be employed. In this figure a portion of the exciting winding B is included in circuit with the armature A and the primary of transformer E, while the secondary of transformer E is connected in series with the whole of winding B. The connections are so made that the current flowing through the portion of winding B in series with armature A is in opposition to the current supplied to the whole winding from the secondary of transformer E. At low frequency the portion of the exciting winding in series with the armature counterbalances in whole or in part the comparatively weak currents delivered to the whole winding by the secondary of transformer E, while at higher frequency the transformer E is relatively more efficient so that the current which its secondary supplies to winding B is relatively considerably greater in its magnetizing effect than the current in the portion of the winding in series with the armature.

I do not desire to limit myself to the particular connections and arrangement of parts shown and described but aim in the appended claims to cover all modifications which are within the scope of my invention.

What I claim as new and desire to secure by Letters Patent of the United States is:—

1. In combination an alternating current series motor provided with means whereby a motor action or a braking generator action can be produced, the means for operating the motor as a braking generator comprising a transformer requiring an abnormally high magnetizing current so that the motor will not build up as a low frequency generator, and leads connecting the motor armature and transformer primary in series to the source and the transformer secondary to the exciting winding of the motor in a direction to produce a torque opposite to the direction of rotation.

2. In combination an alternating current series motor provided with means whereby a motor action or a braking generator action can be produced, the means for operating the motor as a braking generator comprising a transformer having an air gap in its magnetic circuit, and leads connecting the motor armature and transformer primary in series to the source and the transformer secondary to the exciting winding of the motor in a direction to produce a torque opposite to the direction of rotation.

3. In combination with an alternating current series motor, means for operating the motor as a braking generator comprising a transformer requiring an abnormally high magnetizing current so that said motor will not build up as a low frequency generator, and leads connecting the motor armature, a part of the exciting winding of the motor, and the transformer primary to the source and the transformer secondary in series with the whole of said exciting winding.

4. In combination with an alternating current series motor, means for operating the motor as a braking generator comprising a transformer having an air gap in its magnetic circuit and leads connecting the motor armature, a part of the exciting winding of the motor, and the transformer primary in series to the source, and the transformer secondary in series with the whole of said exciting winding.

In witness whereof, I have hereunto set my hand this 17th day of October 1911.

ERNST F. W. ALEXANDERSON.

Witnesses:
BENJAMIN B. HULL,
HELEN ORFORD.